Jan. 20, 1959   J. T. FRASER   2,870,389
MACHINE PROGRAMMING CONTROL
Filed July 19, 1956   2 Sheets-Sheet 1
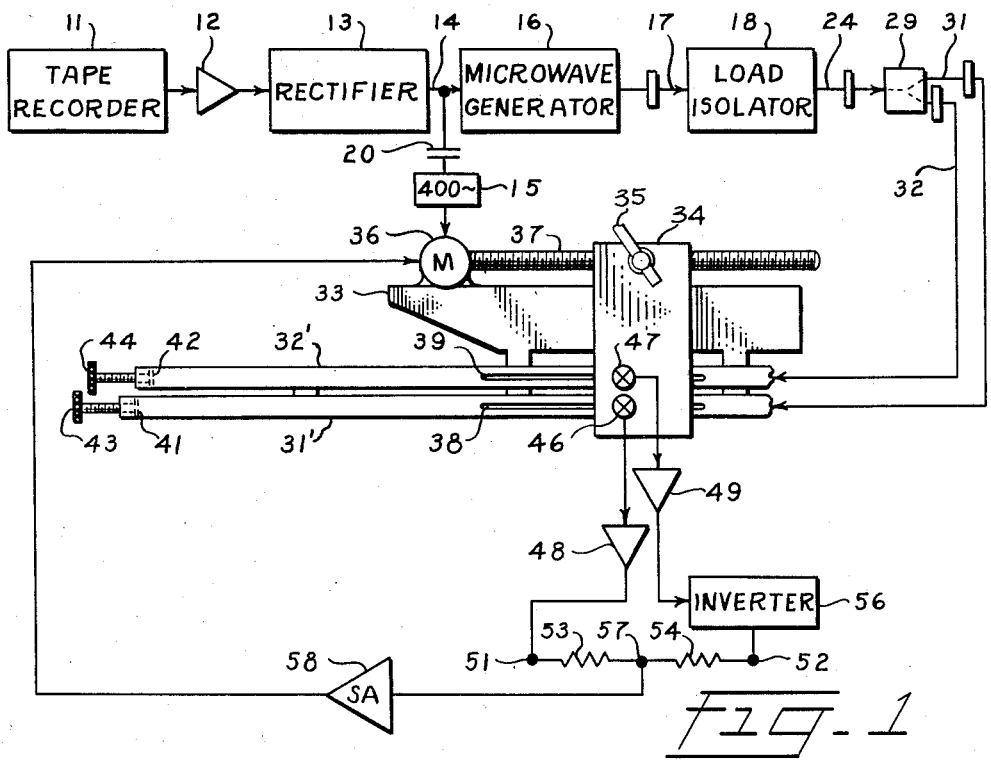
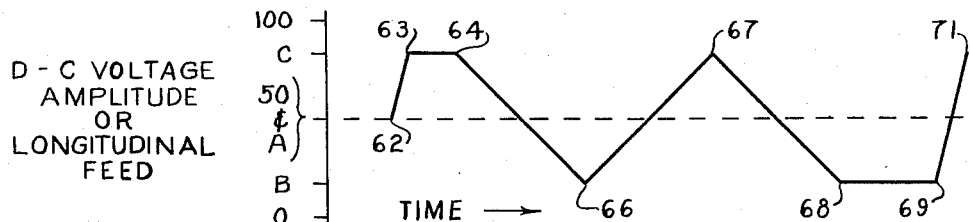
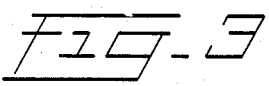
D-C VOLTAGE
AMPLITUDE
OR
LONGITUDINAL
FEED
TIME →
*Fig-3*
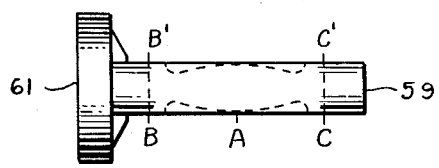
*Fig-2*
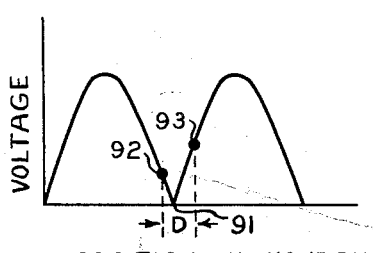
POSITION IN WAVEGUIDE
*Fig-7*
INVENTOR.
JULIUS T. FRASER
BY
ATTORNEY

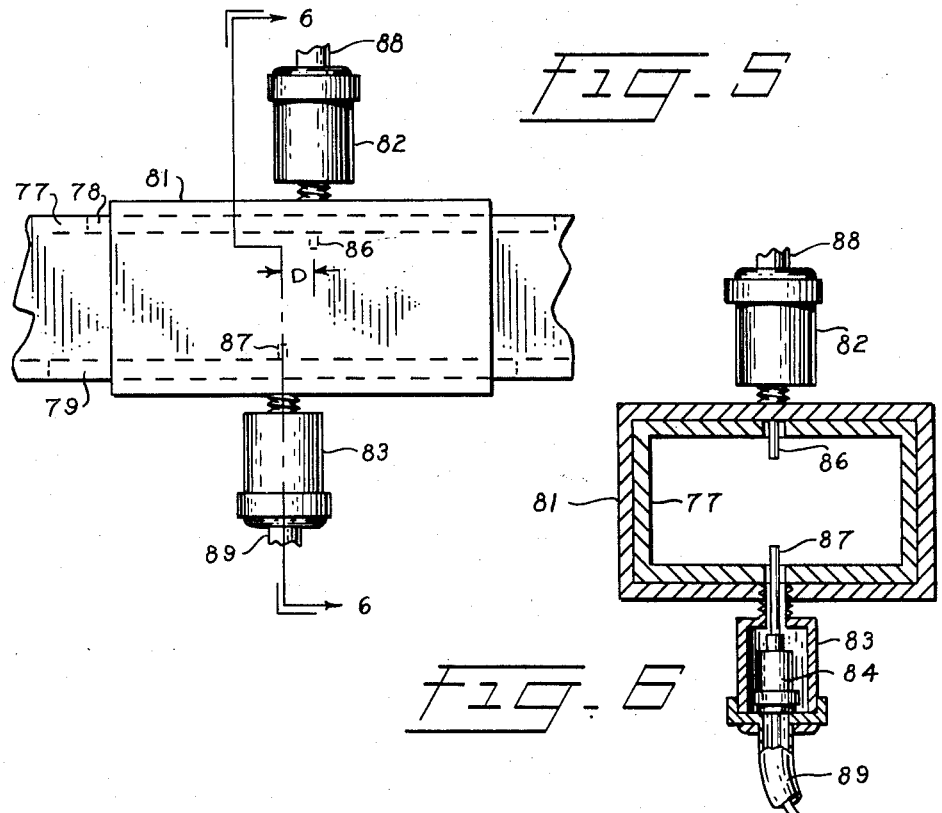

United States Patent Office 2,870,389
Patented Jan. 20, 1959

2,870,389

MACHINE PROGRAMMING CONTROL

Julius T. Fraser, Ossining, N. Y., assignor to General Precision Laboratory Incorporated, a corporation of New York Application July 19, 1956, Serial No. 598,922

8 Claims. (Cl. 318—162)

This invention relates to the control of mechanical linear position through the agency of standing electromagnetic waves in waveguides. It has particularly application to the repetitive program control of the operations of a manufacturing machine from a prepared record.

In the automation of manufacturing processes the need has arisen for the automatic control of a machine, such as an automatic machine tool, through a cycle which is so complex or lengthy that it cannot be done by using conventional cams. This need has been satisfied by the employment in place of cams of various kinds of master records carrying complex or lengthy messages. One such master record consists of a wide tape of relatively thick material in which a groove has been cut, the signal quantity being the distance between the groove and one edge of the tape. Such a device is described in Patent No. 2,679,622, of Hubert B. Deri, entitled Curve Follower. Another method uses a cylinder having a magnetizable surface on which is stored a message in the form of magnetic variations. The common magnetic tape recorder is still another form. It employs a magnetizable tape, a recording head and a playback head, and is currently in wide use for voice and music recording and reproduction. It is also capable of accepting and reproducing or playing back a program for machine control in terms of tape magnetic intensities. The variations in magnetic intensity constituting the program message, translated into voltage-time variations by the playback head, are employed to control the machine operation.

In translating the master program output signal into machine operations it is desirable to avoid heavy mechanical control parts and also to secure high positional accuracy and speed with a design which can be adapted to a wide variety of machine tools and employed in other arts.

The present invention constitutes an improvement in the link between any type of master record and the machine itself. This link translates the message of the record into the actual machine operation. In order to do this the invention provides a microwave generator connected to a waveguide system. The generated microwaves set up standing waves in the waveguide system. A detector sensitive to the nodes and loops of the standing waves is arranged to move along the waveguide system and, by a servomechanism, is arranged to lock to a particular node of the system of standing waves and move with it. Thus as this node is caused by any means to move along the waveguide system the detector and its carriage are compelled to move with the node. A connection is provided between the master record and the microwave system so that the node is moved backward or forward along the waveguide system in accordance with the message transmitted from the master record. The nature of this connection may be various, and is dependent, inter alia, upon the nature of the master record employed.

As one specific example, the master record may comprise magnetic amplitude variations in a magnetic tape.

These variations are read out by the playback mechanism and the resulting signal is amplified and rectified to generate a direct potential proportional to the magnetic record variations. This direct potential is applied to the reflector of a reflex klystron constituting the microwave generator, controlling its microwave output wavelength as applied to the waveguide system. The standing wavelength within the system is correspondingly controlled, and the system is so designed that the controlling potential thus controls the positions of the nodes in a linearly corresponding manner, controlling the position of the detector which is locked to a specific one of the nodes. The detector and its carriage are secured to the machine tool part which is to be controlled. Thus this part is positioned in accordance with the commands received from the master record.

In place of varying the standing wave node position in the waveguide system by varying the microwave frequency, the phase may be adjusted so as to accomplish the same result.

The purpose of this invention is to provide improved apparatus for effecting linear positioning in accordance with a prepared record.

More specifically, the purpose is to provide translating apparatus to position a mechanical component linearly in accordance with a microwave signal representative of the message contained in a prepared record.

Further understanding of this invention may be secured from the detailed description and drawings, in which:

Figure 1 is a schematic drawing of one embodiment of the invention.

Figure 2 is an example of an automatic lathe work piece which can be fabricated by means of this invention.

Figure 3 is a graph representing the variation of the master record amplitude with time and also representing the variation of lathe longitudinal carriage position with time in obedience to the master record.

Figure 4A graphically represents standing microwaves in waveguide 31′.

Figure 4B graphically represents, to the same abscissa scale, standing microwaves in waveguide 32′.

Figure 4C inverts and juxtaposes the graphs of Figures 4A and 4B.

Figure 4D depicts the difference of the graphs of Figure 4C.

Figures 5 and 6 depict side and partly sectioned end views, respectively, of a double-slotted waveguide with two probes for employment in a second embodiment of the invention.

Figure 7 is a graph illustrating the operation of a double-slotted waveguide.

Referring now to Fig. 1, a conventional magnetic tape recorder 11 is arranged to "play back" a magnetic tape record. This prepared record is preferably a constant-frequency alternating-current record which represents by its amplitudes the messages or orders to be given. In this and all other types of prepared record for use with this invention the rate of change of the message or order with respect to time is limited to a rate not greater than the maximum rate of change of linear position with respect to time of which the device being controlled is capable.

The tape recorder output electrical signal is amplified in amplifier 12 and rectified in rectifier 13 to form a direct current signal at conductor 14 having a potential linearly proportional at each instant to the magnetic amplitude constituting the intelligence, record, or order carried by the magnetic tape. This direct current signal is applied to the reflector of a reflex klystron comprising a microwave generator 16. As is well known, the frequency of the microwave output of a reflex klystron is controllable by controlling the reflector potential.

In place of a reflex klystron any other microwave generator whose output wavelength is controllable by direct current magnitude may be employed. The generator preferably should have a direct linear relation between its output wavelength and the controlling potential when the control is of the wavelength type. The generator should also be controllable over a wide range to reduce the required length of the waveguide system which it excites. The travelling wave tube and the backward wave oscillator are generators which may be employed.

A 400 cycle per second generator 15 is coupled through a capacitor 20 and the conductor 14 to the control element of microwave generator 16. Thus the microwavelength control is effected by the direct potential constituting the tape message output mixed with 400 C. P. S. alternating potential.

The output of generator 16 is applied through a rectangular waveguide 17 to a load isolator 18 which permits microwave energy to pass in one direction, to the right in the figure, but not in the reverse direction. This load isolator may be of ferrite or other types well known in the art. The load isolator output waveguide 24 is connected to a power divider 29 which divides the microwave power equally between two output rectangular waveguides 31 and 32. These waveguides are continued as slotted waveguides 31' and 32' which are secured to the frame of an automatic lathe indicated by the outline 33. The tool carriage 34 of this lathe is moved on its longitudinal sliding ways by a motor 36 geared to a lead screw 37 engaging a nut in the carriage 34. The carriage 34 carries a work piece engaging tool 35 adapted to engage a work piece in the usual manner.

It is to be understood that the automatic lathe normally has other movements, such as transverse carriage feed, chuck opening, chuck locking, stock advance, and movements of the tailstock. Any or all of these and other functions may be automatically controlled by additional units of the means of this invention, or in any other way, but as applications of the invention to these functions would be similar to the exampled application to the longitudinal tool feed, they are not here described.

The rectangular waveguides 31' and 32' lie close together and parallel, with their broad surfaces in the same planes. One broad surface of each is provided with a median slot, preferably protected by wavetrap edges. These slots 38 and 39 are of equal length and are at least as long as the maximum longitudinal tool carriage travel which will be required. The two waveguides 31' and 32' are of approximately equal length, and in this example extend beyond the slotted portions by an amount greater than the slot length. In general, when node movement is effected by changing the microwave length, the smaller the range of microwave length change the longer the waveguide that is required. Although in Fig. 1 the waveguides 31' and 32' are shown straight, the unslotted portions may be curved into coils or helices to have space, or folded back under the slotted portions.

The ends of the waveguides 31' and 32' are conductively terminated, these terminations being preferably made adjustable for convenience. Metal pistons 41 and 42 adjusted by heads 43 and 44 are depicted.

Two similar crystal rectifiers 46 and 47 are secured to the carriage 34. Each rectifier is associated with a probe which passes through one of the slots and intrudes a short distance into the interior of the waveguide, in the common form of a probe for measuring voltage standing wave ratio (VSWR). The rectifiers are connected to amplifiers 48 and 49. These amplifiers are connected to the opposite end terminals 51 and 52 of a subtracting network comprising equal resistors 53 and 54, one of the amplifiers, 49, being connected through an inverter 56 which changes the sign and phase of its signal. The midterminal 57 of the subtracting network is applied to a servoamplifier 58 which drives motor 36.

Motor 36 is a two-phase, 400 cycle motor, and its other phase is energized by the 400 C. P. S. generator 15.

In the operation of this device a simple form of spindle is selected as the article to be turned and is indicated in outline by the dashed lines of Fig. 2. The blank 59 is round bar stock and is held in the rotating chuck 61. The lathe tool is assumed to be initially at the position A. The magnetic tape for use in tape recorder 11, Fig. 1, carries a prepared message, as before stated, consisting of magnetic amplitude variations at a fixed carrier frequency. After amplification and rectification the direct voltage magnitude will have the time variations indicated by the graph of Fig. 3, in which the abscissa scale is time and the ordinates represent direct voltage in an arbitrary 0–100 scale. Assuming a linear relationship between the control reflector voltage applied to the microwave generator 16, Fig. 1, and the wavelength in guide of its output energy, the same ordinate scale, Fig. 3, can be taken to represent lathe longitudinal feed distance. The point "50" represents the center point A, Fig. 2, and the bottom and top graph ordinates B and C, Fig. 3, represent the longitudinal tool positions B and C, Fig. 2.

At the start of the graph of Fig. 3 the recorded intelligence quantity changes from point 62 to point 63. The steepness of this line is the maximum rate of change permitted in the master record, and causes the tool carriage to travel at the maximum speed of which its servomechanism is capable, being limited by the speed of response of the servomechanism feedback loop comprising motor 36, Fig. 1, detectors 46 and 47, and amplifier 58.

This variation of the master record, Fig. 3, is translated into movement of the tool carriage as follows. At point 50, Fig. 3, a selected alternating voltage amplitude "50" is transmitted from recorder 11, Fig. 1, through amplifier 12 and rectifier 13, and is applied as a direct potential, modulated at 400 C. P. S., to microwave generator 16, resulting in a specific output wavelength $m$ in the waveguides, also modulated at 400 C. P. S. This causes standing waves in waveguides 31' and 32'. Although these waves are sinusoidal in voltage form, detecting devices such as the detectors and probes 46 and 47 give indications representative of microwave power rather than voltage, and the detector 400 C. P. S. output plotted against longitudinal position of the probe in the waveguide has the sine-squared form of Fig. 4A. A similar graph applies to waveguide 32' but since the ends 41 and 42, Fig. 1, are slightly displaced, being relatively adjustable for this purpose by screw plungers 43 and 44, the nodes in waveguides 32' are correspondingly displaced from the nodes in waveguide 31', as shown in Fig. 4B. As the inverter 56, Fig. 1, is employed in the output of detector 47, reversing the output phase, its output can be plotted in sense opposite to that of detector 46, so that the two outputs plotted together and representing the voltages applied to terminals 51 and 52 would appear as in Fig. 4C. Electrical subtraction produces a difference voltage at terminal 57, and this difference voltage can be depicted by subtracting the two graphs of Fig. 4C to form the difference graph of Fig. 4D. The output at terminal 57, Fig. 1, thus becomes zero at each of the axis crossings of Fig. 4D. Polarities are so arranged that the steep axis crossing points 72, 73, 74, 76 etc., are stable null points. When the output from servoamplifier 58, Fig. 1, is represented as above the axis near one of these null points, the motor 36, Fig. 1, is operated in such direction as to move the carriage 34 in such a direction as to cause the output of terminal 57 to approach that null point. If the servoamplifier output has the phase represented by a position on the graph below the axis, the motor is rotated in the opposite direction and thus the output at terminal 57 is again brought toward the null point.

Therefore, when the klystron reflector voltage has the stated median magnitude, that is, output wavelength $m$, the lathe carriage is positioned with its electronic control "locked" to a particular selected position represented by, say, point 73, Fig. 4D, and the carriage is positioned at the center point A of the work piece, Fig. 2. When the master record quantity increases from point 62 to point 63, Fig. 3, the voltage applied to the klystron reflector is increased, increasing the wavelength of the klystron output to $n$. Since the probes which project into waveguides 31' and 32' are locked to a particular node pair which is a selected number of standing waves distant from the left ends 41 and 42 of the waveguides, the probes and the lathe carriage are servoed to the right as the wavelength increases. This is because the number of nodes between the probes and the closed ends of the waveguides remains the same, but the sum of the standing wave lengths increases in proportion to the increase of $n$ over $m$. The amount by which the carriage moves is arranged, by selection of scale factors, to be such that when the voltage amplitude becomes C, Fig. 3, the carriage arrives at C, Fig. 2.

During this longitudinal movement of the carriage from A to C the tool is retracted away from the work piece by its transverse feed. This would preferably be effected by a separate automatic mechanism which is not described in detail for reasons stated. At C, the longitudinal feed becomes stationary in obedience to the uniform amplitude of recording indicated by line 63–64, Fig. 3. During the time period indicated by line 63–64 the transverse feed advances a cutting-off tool which cuts the blank off at dashed line C—C', forming the end of the spindle, and retracts the tool. The amplitude of the record of Fig. 3 then is decreased slowly to 66, causing the tool to travel to B, Fig. 2, while the transverse feed is such as to take a roughing cut. The record amplitude then increases to 67, causing the tool to take a cut from B to C, Fig. 2. The record amplitude, Fig. 3, next decreases to point 68, during which the tool takes its finishing cut from C to B, Fig. 2, completing the spindle form. Beginning at point 68, Fig. 3, the constant amplitude of the record indicated by line 68–69 orders quiescence of the longitudinal feed for enough time to permit a cutting-off tool to sever the spindle from the stock at line B—B'. At this point time is also taken to permit other controls to open the chuck, advance the stock, and secure the stock again in the chuck. The line 68–69 is therefore longer than the line 63–64. At the time 69 the tool is again moved, as indicated by the line 69–71, to the point C, Fig. 2, to commence work on the next spindle. The slope of the line 69–71, Fig. 3, is the same as the slope of line 62–63, and is the steepest slope permitted by the time constant of the servomechanism, as before described.

A second embodiment employs a single rectangular waveguide having two longitudinal slots in place of the two waveguides 31' and 32', Fig. 1. The two slots are at the center lines of the two broad faces of the waveguide and a probe is provided to slide in each slot. One form of construction is depicted in Figs. 5 and 6. The rectangular waveguide 77 is provided with a median slot 78 in its upper face and a second median slot 79 in its lower face. A probe carriage 81 surrounds the waveguide. To the probe carriage are secured crystal holders 82 and 83. Each contains a crystal rectifier, the lower rectifier 84 being depicted in its cross sectional holder, and a probe 86 and 87. The probes are longitudinally spaced apart by the distance D, Fig. 5. The rectified outputs of the two crystal rectifiers are taken by means of coaxial cables 88 and 89 to amplifiers 48 and 49, Fig. 1. The remainder of the mechanical and electrical arrangements are similar to those described in connection with Fig. 1.

In the operation of the double-slotted single waveguide embodiment, the waveguide 77 is excited at one end from the load isolator 18, Fig. 1, and the other end of waveguide 77 is short-circuited. Standing waves are therefore set up in the waveguide. The two probes 86 and 87, Figs. 5 and 6, are positioned to straddle a microwave voltage node such as node 91, Fig. 7, at positions 92 and 93. The amplitudes of the potentials derived from the probes will then in general be different, and the difference is employed as an error signal to energize the servo loop including motor 36, Fig. 1, servoing the probe carriage 81, Figs. 5 and 6, until the sampled probe voltage amplitudes 92 and 93, Fig. 7, are exactly equal, when the probes will be approximately equidistant on opposite sides of the node. If the node moves, the servomechanism will move the carriage including probe carriage 81, Figs. 5 and 6, to maintain this situation. The probes will not remain centered on a standing wave loop because it constitutes an unstable null.

In place of rectangular slotted waveguide containing either a single slot or two slots, other types of slotted waveguide may be used, the techniques of their use being well known. Such waveguides include square and round hollow waveguide with or without longitudinal fins or ridges sometimes called mode purifiers, and coaxial waveguide with or without ridges.

What is claimed is:

1. A machine programming control for controlling the relative physical displacement of a workpiece and a workpiece engaging tool comprising, means emitting an electrical intelligence signal, a waveguide system adapted to have standing wave energy therein, said standing wave energy having loops and nodes at selected positions in said waveguide system, means actuated by said intelligence signal for determining the positions at said loops and nodes, movable sensing means for sensing a selected electromagnetic field plane of said loop and node pattern distribution, means positioning said sensing means at a point along said waveguide system determined by a selected electromagnetic field plane of the loop and node standing wave pattern distribution, operating means for selectively positioning said work piece engaging tool relative to said work piece, and means for controlling the position of said operating means in accordance with the position of said sensing means.

2. A machine programming control for controlling the relative positional displacement of a workpiece and workpiece engaging tool comprising, record means having an intelligence signal recorded thereon, a microwave generator, a waveguide system capable of supporting microwave energy in a standing wave pattern of loops and nodes at selected positions therein, said waveguide system being energized by said microwave generator, means actuated by said intelligence signal for determining the positions of said loops and nodes, movable sensing means for sensing a selected electromagnetic field plane of said loop and node pattern distribution coupled to said waveguide system, means positioning said sensing means to a position along said waveguide system determined by a selected electromagnetic field plane of the loop and node pattern distribution, said machine including a machine element portion thereof, the position of which determines the physical displacement of said workpiece engaging tool relative to said workpiece, and means controlling the position of said machine element portion in accordance with the position of said sensing means.

3. A machine programming control for controlling the relative positional displacement of a workpiece and workpiece engaging tool comprising, means emitting an electrical intelligence signal, a microwave generator, a waveguide system coupled to said generator and capable of supporting microwave energy in a standing wave pattern of loops and nodes at selected positions therein, means including said microwave generator actuated by said intelligence signal for determining the position of said loops and nodes, sliding probe means coupled to said waveguide system sensing a selected electromagnetic field plane of said loop and node pattern distribution, means for deriving an error signal from said sliding probe means, servomechanism means including an electric motor actuated by said error signal for maintaining said sliding probe means at said electromagnetic field plane, said machine including a machine element portion thereof, the position of which determines the physical displacement of said workpiece engaging tool relative to said said workpiece, and means controlling the position of said machine element portion in accordance with the position of said sliding probe means.

4. A machine programming control for controlling the relative positional displacement of a workpiece and workpiece engaging tool comprising, record means having an intelligence signal recorded thereon, a microwave generator, a waveguide system capable of supporting microwave energy in a standing wave pattern of loops and nodes at selected positions therein coupled to the output of said generator, means including said microwave generator and actuated by said recorded signal for determining the positions of said loops and nodes, sliding probe means coupled to said waveguide system sensing the amplitude and sense of the electromagnetic field potential adjacent a selected node within said waveguide system, means for deriving an error signal from said sliding probe means the amplitude of which is representative of its distance departure from said selected node, servomechanism means actuated by said error signal, said servomechanism means including an electric motor positioning said sliding probe means to bring said error signal to a null, said machine including a machine element portion thereof, the position of which determines the physical displacement of said workpiece engaging tool relative to said workpiece, and means controlling the position of said machine element portion in accordance with the position of said sliding probe means.

5. A machine programming control for controlling the relative positional displacement of a workpiece and workpiece engaging tool comprising, a record medium having an intelligence signal recorded and stored thereon, means for deriving an electrical signal therefrom containing said intelligence information, a microwave generator, a waveguide system having the end coupled to the output of said generator and provided with a reflective termination at the other end whereby energy introduced into said waveguide system by said generator produces standing electromagnetic waves having nodes at distances from said reflective termination which are integral multiples of one-half wavelength of the energy in said waveguide system, means controlled by said electrical signal for controlling the wavelength of the energy output of said microwave generator whereby the positional locations of the nodes in said waveguide system are controlled, sliding probe means coupled to said waveguide system for sensing the amplitude and sense of the field potential adjacent a selected node in said waveguide system, means for deriving an error signal from said sliding probe means, said error signal being representative of the displacement of said sliding probe means from the position of said selected node, servomechanism means actuated by said error signal, said servomechanism means including an electric motor positioning said sliding probe means to bring said error signal to a null, said machine including a machine element portion thereof, the position of which determines the physical displacement of said workpiece engaging tool relative to said workpiece, and means controlling the position of said machine element portion in accordance with the position of said sliding probe means.

6. A machine programming control for controlling the relative positional displacement of a workpiece and workpiece engaging tool comprising, a record medium having an intelligence signal recorded and stored thereon, means for deriving an electrical signal therefrom the amplitude of which varies in accordance with the intelligence information, a microwave generator modulated by said electrical signal producing a microwave energy output the wavelength of which is dependent on the amplitude of said electrical signal, a waveguide system having one end coupled to the output of said generator and having its other end reflectively terminated whereby standing waves having a node separation equal to one-half the wavelength of the energy introduced therein are set up in said waveguide system, said waveguide system being provided with a pair of slots extending along the length thereof, a pair of probes each extending into a respective slot of said waveguide system, means for deriving a signal from each of said probes each of which is representative of the field potential at the location of the respective probe, means for subtracting the signals derived from said probes to produce an error signal determinative of the displacement of said probes relative to the position of a selected one of the nodes in said waveguide system, servomechanism means actuated by said error signal, said servomechanism means including a motor positioning said pair of probes longitudinally in said waveguide system relative to said selected node therein to reduce said error signal to a null, said machine including a machine element portion thereof, the position of which determines the physical displacement of said workpiece engaging tool relative to said workpiece, and means controlling the position of said machine element portion in accordance with the position of said pair of probes.

7. A machine programming control in accordance with claim 6 in which said waveguide system includes a pair of rectangular waveguide sections positioned in parallel relationship, each being provided with one of said pair of slots in a respective broad face thereof.

8. A machine programming control in accordance with claim 6 in which said waveguide system includes a single rectangular waveguide section with said pair of slots being formed in opposite broad faces thereof.

No references cited.